Oct. 18, 1960
J. I. NUBANI
2,956,374
GLASS BULB FABRICATION
Filed April 30, 1957
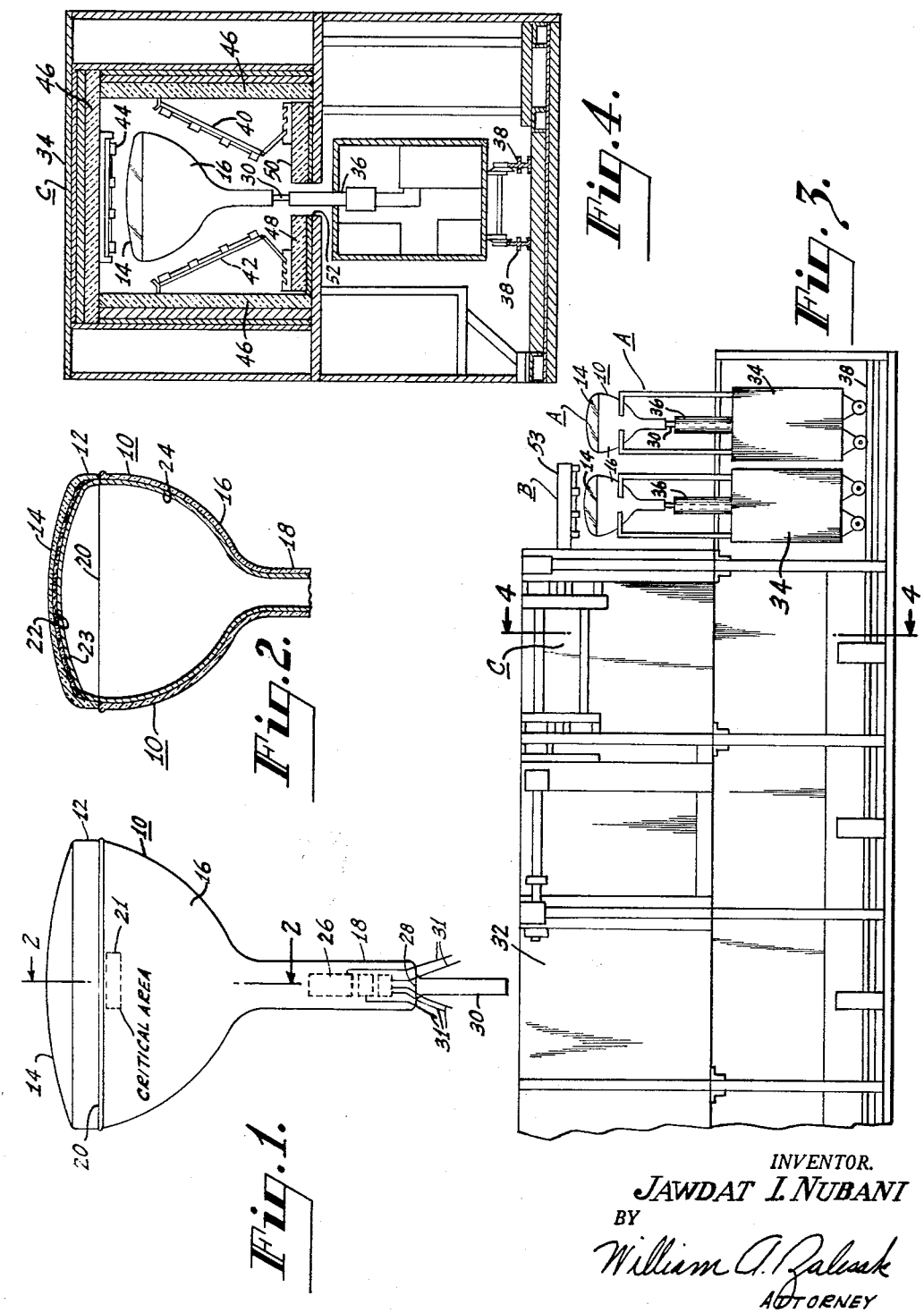
INVENTOR.
JAWDAT I. NUBANI
BY
William A. Zalesak
ATTORNEY

2,956,374

GLASS BULB FABRICATION

Jawdat I. Nubani, Marion, Ind., assignor to Radio Corporation of America, a corporation of Delaware Filed Apr. 30, 1957, Ser. No. 656,017

8 Claims. (Cl. 49—89)

This invention is directed to the art of fabricating a cathode ray tube, and is particularly related to high temperature processing of a glass bulb of a cathode ray tube.

A cathode ray tube formed with a glass envelope is assembled from a face plate portion consisting of a cap of relatively thick glass and a glass funnel having relatively thin side walls. The cap and funnel are sealed together to form an enclosing bulb. Extending from the small end of the funnel is a tubular neck portion, into which is sealed an electron gun. A normal fabrication procedure for such a tube envelope is one in which the assembled bulb has deposited on the inner surface of the face plate a phosphor screen which in turn is substantially coated with a thin lacquer film, and upon which is deposited an evaporated film of aluminum metal. The inner wall of the funnel portion is normally coated with a conductive film.

The bulb portion alone with its several coatings is sent through a bake-out lehr, where it is baked for a period of time at 430° C. to 450° C. This baking procedure removes moisture from the phosphor screen, as well as the volatile lacquer film between the phosphor and the aluminum coating. Also, the conductive film on the inner surface of the bulb is baked out at this time to remove all moisture. Normally, within 15 to 20 minutes from the time the bulb leaves the lehr, an electron gun mount including an exhaust tubulation is sealed into the open end of the neck of the tube and the tube is placed in an exhaust machine. Here the tube goes through a final bake-out and degassing of the tube elements, during a simultaneous exhausting of the tube. The exhaust machine consists of a long oven. The tube is mounted on an exhaust cart having an individual exhaust system and electrode connections for final tube processing. The exhaust cart, with the tube, is sent through the oven, where the tube is raised to a temperature not greater than 420° C. and where its temperature above 400° C. is maintained for at least 12 to 15 minutes.

Between the lehr bake-out and the final exhaust machine bake-out and degassing operation, the tube will be exposed to room temperatures for approximately 20 minutes. During this period of time, the tube has an opportunity to cool down from the temperature of the lehr to a temperature around 70° C. At this temperature, the tube is sent into the high temperatures of the exhaust oven in the neighborhood of 400° C. The impact of this high temperature on the relatively cool glass bulb has resulted in an excess amount of breakage because of the thermal shock encountered by the glass envelope. This breakage is due to the fact that different portions of the glass bulb heat at different rates, when first exposed to the high temperatures. The face plate cap portion of the tube, made of relatively heavy glass, has a much slower heating rate than the relatively thin glass side walls of the funnel portion. Consequently, the different heating rates result in different expansion rates of the bulb parts and cause glass breakage.

It is thus an object of the invention to provide a novel method of tube fabrication involving high temperatures and wherein breakage of glass parts is minimized.

It is another object of the invention to provide a method of vacuum tube fabrication involving high temperatures wherein glass portions of the bulb are able to withstand differentials of expansion without breakage.

It is a further object of the invention to provide a novel technique for fabricating glass cathode ray tube bulbs to minimize breakage, when exposed to high temperatures.

The invention is in a heat treatment of the tube at certain stages in its fabrication cycle, wherein the distribution of strains in the glass of the bulb is controlled by a selective application of heat to a localized area of the bulb, so that breakage of the glass is minimized when the tube is exposed to high temperatures. Specifically, in the fabrication of cathode ray tubes of the type described, the face plate of the tube alone is exposed to a high temperature treatment in order to change the strain pattern on the side walls of the tube to reduce the tensional stresses to enable the bulb to stand the thermal shock when exposed to sudden high temperatures. Before the bulb is exposed to the high temperatures of the exhaust oven, a special overhead heater is used to heat only the face plate of the bulb to a relatively high temperature as compared to the temperature of the funnel portion. This reduces the strain in the critical region of the bulb and compensates for tensional stresses set up as the bulb enters the high temperature exhaust oven.

Figure 1 is an elevational view of a cathode ray tube of the type described in this application.

Figure 2 is a partial sectional view of Figure 1, taken along section lines 2—2 of Figure 1.

Figure 3 is an enlarged view of a portion of a cathode ray tube exhaust machine.

Figure 4 is a sectional view of an exhaust machine of Figure 3 and in accordance with section line 4—4.

Figures 1 and 2 disclose a cathode ray tube bulb 10 formed of glass. Bulb 10 consists of a cap portion 12, which includes a glass face plate 14 closing the large end of bulb 10. Forming the other portion of the bulb is a funnel portion 16 having sealed to its smaller end a glass tubular neck 18. The normal fabrication of a glass bulb, of the type shown in Figures 1 and 2, is that in which a cap portion 12 is molded by conventional glass molding techniques into the configuration shown in Figures 1 and 2. The bulb funnel portion 16 is either blown or spun into the funnel shape shown in Figures 1 and 2. The funnel 16 is sealed at the periphery of its larger end to the edge of the face plate cap 12. The seal area is indicated at 20. A glass tubular neck portion 18 is then sealed to the small end of funnel 16 to complete the glass bulb. This glass bulb 10 constitutes the tube envelope, which during tube fabrication is evacuated and sealed.

In a bulb of the type described, having a face plate diagonal in the order of 24 inches, the cap portion has varying thicknesses of glass at different portions. For example, in the center of the face plate, the glass is substantially 0.325 inch, while at the periphery of the face plate and in the corners of the cap 12, the glass is considerably thicker and may vary from 0.500 inch to 0.650 inch. The lip of the cap varies from this maximum glass thickness at the corners of the face plate along a taper, resulting in a glass thickness at the edge of the cap in the region of seal 20, varying in thickness from 0.300 inch to 0.335 inch. The funnel portion 16 of the glass bulb adjacent to the seal area 20 has a varying thickness with a minimum thickness in the centers of the side wall panels. In these areas the glass is in the order of 0.207 inch, and only increases slightly around the periphery of the end of the funnel portion 16 at the seal 20.

Accordingly then, the face plate cap portion is considerably more massive than the adjacent areas of the funnel portion 16, with the glass at the corners of the cap portion being relatively heavy. This design of glass cathode ray tube bulb is that which has proved advantageous for television picture tubes, and is one which gives the greatest strength with the minimum amount of glass.

To form the luminescent screen 22 of the cathode ray tube, a thin film of phosphor material is first deposited on the inner surface of the face plate 14. After drying the phosphor film, it is wet with water and a thin lacquer film of isobutyl methacrylate, for example, is formed over the phosphor to form a foundation layer upon which is evaporated a thin reflecting film 23 of aluminum. Further fabrication of the bulb includes the application of a conductive coating 24 either of colloidal graphite mixed in binder or as a continuation of the aluminum coating 23.

At this point of tube fabrication, it is necessary to bake the tube so as to dry out the several coatings 22 and 24 formed on the inner surfaces of the bulb as described. Accordingly, the glass tube 10 is sent through a lehr or oven, where the temperature of the bulb is raised to a point in the neighborhood of 430° C. to 450° C. and maintained for a period of 15 to 20 minutes. During this time, the lacquer film of isobutyl methacrylate is volatilized and escapes from the bulb. The phosphor coating of screen 22 is also dried, and all moisture and volatile constituents of the conductive coating 24 are baked out of the tube. The tube is then taken from the lehr to a sealing machine, where an electron gun structure 26, mounted on a glass stem 28, is sealed into the open end of the tubular neck 18 of the bulb. Stem 28 also includes an exhaust tubulation 30, for evacuating the tube envelope during the final fabrication steps, and leads 31 sealed through stem 28 and connected to different electrodes of gun 26.

After sealing-in the electron gun 26, the tube is taken to an exhaust machine for final bake-out and degassing. Figures 3 and 4 show views of the exhaust machine, which consists substantially of an oven 32. First, the tube is mounted neck-down on a small 4-wheeled cart 34, with the exhaust tubulation 30 hermetically connected to an exhaust pumping system 36. Leads 31 are appropriately fastened to terminals (not shown) on the cart so as to connect the several electrodes of gun 26 to appropriate voltages during tube bake-out and processing. A pair of rails 38 form a track, along which the cart may roll, as it is indexed from station to station in the exhaust machine.

The tube 10, from the sealing machine, is loaded onto a cart 34 in a position A. As the machine indexes, cart 34 is driven by a chain drive (not shown) to which it is connected, to a second position B in front of doors closing the oven 32. The next index automatically opens the doors of the oven and the loaded cart is moved from position B into a first position C within the oven 32. In this position C, the tube bulb is exposed to electric heater units 40, 42 and 44 (Figure 4) which radiate an intense heat onto the tube bulb 10. Heater units 40 and 42 are disposed at the sides of the oven and direct heat onto the thin side walls of the bulb, while heater unit 44 directs heat onto the face plate of the tube. As shown in Figure 4, the walls of the oven 32 are formed with sides and top of several thicknesses of refractory insulating material 46. The bottom of the oven 32 consists of two sections 48 and 50, also of insulating material. These sections, however, are spaced apart to form a free path 52 to allow passage of the neck 18 of the bulb as it is carried through the oven by its respective cart 34. In the position C of the exhaust oven, the roughing pump of exhaust system 36 starts to evacuate the bulb.

The heater units 40, 42 and 44 extend through the oven 32 for the first seventeen positions. During the first seven positions the tube is heated from the relatively low temperature at which it enters the oven to a relatively high temperature not above 420° C., for the type of tube described. The heaters in the next ten positions of the oven maintain the temperature of the glass bulb in the neighborhood of 405° C., so that the enclosed structures of the cathode ray tube are baked at a temperature of over 400° C. for a period of from 12 to 15 minutes. Through the next fourteen positions in the oven, there are normally no heating elements provided, and during this time, the bulb is allowed to cool down from its high temperature of over 400° C. to a temperature in the neighborhood of 260° C. to 300° C., depending upon the size of the bulb and the amount of glass in the bulb. Because of the closed nature of the oven in this cooling section, it is possible to control the cooling and allows the bulb to gradually lose its heat. During the travel of the tube 10 through the length of the oven, the exhaust system is operating to maintain the tube envelope evacuated. At the last oven position the bulb passes out of the other end of the oven (not shown), into substantially the room atmosphere at which position the exhaust tubulation 30 is sealed.

The above description of tube fabrication is one which is used in mass production of cathode ray tubes for television purposes. These tubes are of relatively large size, having a rectangular face plate with a diagonal, which may vary from 17 inches to 24 inches, depending upon the size of tube. Between the bake-out lehr and the exhaust machine 32, the glass bulbs are exposed to room temperature for a period of time in the neighborhood of 20 minutes, during which time the bulbs cool from their lehr bake-out temperature, which is about 430° C. to 450° C. The face plate and funnel portions of each bulb have cooled to a temperature around 70° C. when the bulbs enter the exhaust oven 32. Bulbs at this relatively low temperature, when introduced directly into the oven 32, undergo a thermal shock upon exposure to the high radiant heat of the oven. At this point, considerable breakage takes place due to the fact that portions of the glass envelope of the tube are heated at different rates, and thus undergo expansion of different amounts.

It was found that the outer surface of glass bulbs, upon leaving the bake-out lehr, possess a temporary strain pattern, in which areas on the surface of the glass bulb are under tensional stress. It was found that there is a critical area on the bulb surface, from which a majority of the cracks originate, which result in tube failure. The critical area of a bulb of the type described, is that outer surface area of the bulb which is found to possess the highest tension strain.

On rectangular bulbs, of the type shown in Figures 1 and 2, this critical area of highest tension strain is located in the side wall of the funnel portion within one inch of the seal area 20 and at the center of the long side of the bulb. In Figure 1 this area is schematically indicated at 21. It was further discovered that the temporary strain pattern set up in the bake-out lehr and which is one due to tensional stresses in this critical area 21 in the bulb, remains during the sealing-in of the gun and until the bulb is introduced into the exhaust oven 32. During bulb cooling between the bake-out lehr and the exhaust oven, the tensional strains in the critical area increase due to the faster cooling rate of the thin side walls of funnel portion 16 as compared to the slower cooling rate of the more massive cap portion 12. Furthermore, the sudden exposure of the bulb to the high temperature heater units 40, 42 and 44 of the oven further increases the temporary strain in the critical area 21.

Glass under tensional stress is weaker than glass under compressional stress. A bulb, such as that described above and shown in Figures 1 and 2, decreases in mechanical strength and thermal shock resistance when under high tensional stress. According to the invention, steps are taken to relieve the tensional stress pattern of a glass bulb in the critical area, as it enters the oven 32.

The amount of strain in the critical area 21 can be measured in millimicrons, which is the change in the wavelength of light when the tube is viewed in reflected, polarized light with a polarimeter, as the tube changes temperature from an equilibrium condition such as room temperature. Normally the tube in position A has a tensional strain in the critical area of around fifty millimicrons. This tensional strain is increased as the tube enters the oven 32 and is heated to baking temperature. Within the oven the tensional strain may go as high as 360 millimicrons, which is excessive, as tubes having more than 345 millimicrons of tensional strain in the critical area are likely to implode or crack. The implosion may take place in the oven 32, or later on during further tube processing or even in storage.

Therefore, in accordance with the invention, the face plate 14 of the glass bulb alone is heated in the position B (Figure 3) prior to the entrance of the bulb into the exhaust oven 32. By pre-heating the face plate in this manner, in position B, the tensional glass strain in the critical area is reduced in amount by as much as 150 millimicrons as the tube enters through oven 32. The invention is carried out by the use of an over-head heater unit 53, positioned above the face plate of the bulb, in position B. Heater unit 53 may be one carrying 17 amperes at 220 volts, for example. This is not limiting.

The normal index of the exhaust machine described, is 65 seconds. Thus, the face plate of the tube, in position B is exposed to radiant heat of unit 53 for this period of time. This is sufficient to raise the temperature of the face plate approximately 100° C. more than the side walls of the funnel portion 16 of the bulb, which during this time are exposed to ambient room temperature. Upon heating the face plate glass to the higher temperatures, in position B the face plate expands faster than the cooler side walls of the funnel portion and will reduce the tensional strain in the surface of the glass funnel in the critical area. This reduction of the tensional strain greatly increases the thermal shock-resistance of the bulb, so that it can withstand, to a better degree, the temperature and evacuation conditions of the exhaust oven 32. The pre-heating of the face plate is described as being undertaken as a single position B of the exhaust oven. However with preferential face plate heating, it has been proven that the greater the differential in temperature between the face plate 14 of the bulb and the funnel portion 16, the less will be the tensional strain in the critical area. Accordingly, if the index of the machine were slower, the face plate could be heated to a higher temperature than for the time described above, or, it is within the scope of the invention to utilize additional heater units in position A of the exhaust oven, if this expediency would prove feasible. The change of the tensional strain in the critical area is roughly proportional to the temperature differential between the face plate and the funnel portion 16 of the bulb. Thus, heating the face plate to a smaller degree than that described will not result in reducing the stress in the critical area to the same degree. It is within the scope of the invention to provide sufficient heat to the face plate before the bulb enters the oven so as to reduce the tensional strain in the critical area a maximum amount for the conditions of tube fabrication.

The control of the glass strain in the critical area of the tube is a selective application of heat to a localized area of the bulb and is in contrast to previous attempts to maintain all parts of the bulb at the same temperature during the heating and cooling cycles. This novel control of the glass strain pattern of the tube results in a decided decrease in breakage of glass bulbs with the mass production procedures described above. It is recognized that the strain pattern set up by the various fabrication steps in the bake-out lehr and the exhaust oven, are merely temporary and remain with the tube during the time it is exposed to high temperatures. Thus, in accordance with the invention, there is a distinct advantage in controlling the strain pattern by modifying it in a direction which results in a minimum of breakage. The strain pattern set up in the bulb does not appear to be due to the temperature differential between the face plate portion of the tube and the glass funnel portion, but appears to be more a result of the physical movement or expansion of the face plate relative to the side walls of the funnel. Control of the strain pattern by pre-heating the face plate before the bulb enters the exhaust oven clearly reduces the implosion rate of evacuated bulbs in the exhaust oven with an increasing savings of materials and time.

What is claimed is:

1. The method of processing a glass article having a relatively thick portion and an adjacent thinner portion having a strain pattern, said method comprising heating said relatively thick portion to a temperature below the softening point thereof while maintaining said adjacent thinner portion having a strain pattern at a lower temperature in order to modify said strain pattern in a direction to strengthen the thermal shock resistant properties of said thinner portion, and then baking said article.

2. The method of processing a glass article having a relatively thick portion and an adjacent thinner portion having a surface stress pattern, said method comprising the application of heat to said relatively thick portion to heat said thick portion to a temperature lower than the softening point thereof while maintaining said adjacent thinner portion having a surface stress pattern at a temperature of at least 100° C. below that of said relatively thick plate portion, thus changing the surface stress pattern of said thinner portion toward a compressional pattern to strengthen the thermal shock resistant properties of said thinner portion and then baking said article.

3. The method of processing a glass cathode ray tube subjected to substantial temperature variations having a relatively thick glass face plate portion and a thinner glass funnel portion adjacent to said face plate portion, said portions being under strain and stress, said method comprising the steps of heating said face plate portion to a temperature below the softening point thereof so that a temperature differential of at least 100° C. is developed between said thick glass face plate portion and said thinner funnel portion thus changing the surface stress pattern of said funnel portion toward a compressional pattern, and subjecting said tube to a baking temperature above 400° C.

4. The method of processing a glass cathode ray tube subjected to substantial temperature variations having a relatively thick glass face plate portion and a thinner glass funnel portion adjacent to said face plate portion, said portions being under strain and stress, said method comprising the steps of heating said face plate portion to a temperature below the softening point thereof so that a temperature differential of at least 100° C. is developed between said thick glass face plate portion and said thinner funnel portion thus reducing the tensional surface stress of said funnel portion toward a compressional pattern, and subjecting said tube to a baking temperature above 400° C.

5. In the method of processing a glass cathode ray tube subjected to substantial temperature variations having a relatively thick glass face plate portion and a thinner glass funnel portion, said portions being under strain and stress, wherein said tube is baked at temperatures of about 450° C. to remove the moisture therein and an electrode structure is sealed into said tube while it is cooling from its baking temperature; the steps of heating the face plate of said tube to a temperature below the softening point thereof so that a temperature differential of at least 100° C. is developed between said face plate portion and said funnel portion thereby changing the surface stress pattern of said funnel portion toward a compressional pattern, and baking and degassing said tube at a temperature above 400° C.

6. The method of processing a glass cathode ray tube subjected to substantial temperature variations having a relatively thick glass face plate portion and an adjacent thinner glass funnel portion, said portions having patterns of stress and strain, said method comprising the steps of heating said face plate portion of said tube to a temperature below the softening point thereof thus reducing the tensional stress of said funnel portion, and immediately subjecting said bulb to a baking temperature of over 400° C.

7. In the method of processing a glass cathode ray tube having a relatively thick glass face plate portion and an adjacent thinner glass funnel portion having a critical area on the surface thereof, wherein said tube is subjected to heating and cooling whereby a temporary tensional stress pattern is formed on the surface of said critical funnel portion; the steps of heating said face plate portion to a temperature below the softening point thereof so that a temperature differential of at least 100° C. is developed between said face plate portion and said funnel portion thus changing the tensional stress pattern in said critical area to a compressional pattern, and immediately subjecting said tube toward a baking temperature of over 400° C.

8. The method of processing a glass cathode ray tube having a glass face plate portion with a thickness varying between 0.300 inch to 0.650 inch and a glass funnel portion about 0.207 inch in thickness, said portions having been subjected to substantial temperature variations thereby resulting in formation of a temporary tensional stress pattern in said funnel portion, the method comprising selectively heating said face plate portion to a temperature below the softening point thereof so that a temperature differential of at least 100° C. is developed between said face plate portion and said funnel portion thus reducing said tensional stress, said reduction being proportional to said temperature differential and then baking said article at a temperature of over 400° C.

References Cited in the file of this patent

UNITED STATES PATENTS

| | | |
|---|---|---|
| 2,009,748 | Sherwood | July 30, 1935 |
| 2,244,715 | Long | June 10, 1941 |
| 2,269,597 | Mitford | Jan. 13, 1942 |
| 2,375,944 | Quentin | May 15, 1945 |
| 2,539,159 | Peiler | Jan. 23, 1951 |
| 2,754,628 | Dawe | July 17, 1956 |
| 2,784,531 | Hahn | Mar. 12, 1957 |

FOREIGN PATENTS

| | | |
|---|---|---|
| 450,464 | Great Britain | July 17, 1936 |

UNITED STATES PATENT OFFICE

CERTIFICATE OF CORRECTION

October 18, 1960

Patent No. 2,956,374

Jawdat I. Nubani

It is hereby certified that error appears in the printed specification of the above numbered patent requiring correction and that the said Letters Patent should read as corrected below.

Column 3, line 26, for "tube" read -- bulb --; column 5, line 64, after "is" insert -- thus --; column 6, line 36, strike out "plate".

Signed and sealed this 11th day of April 1961.

(SEAL)
Attest:

ERNEST W. SWIDER
Attesting Officer

ARTHUR W. CROCKER
Acting Commissioner of Patents